(12) United States Patent
Jallapelli et al.

(10) Patent No.: US 9,246,710 B2
(45) Date of Patent: Jan. 26, 2016

(54) METHOD AND APPARATUS FOR MANAGING INTERNET CONNECTION SHARING

(75) Inventors: Vanisri Srikrishna Jallapelli, Bangalore (IN); Amit Shekhar, Bangalore (IN); Prabhu Kumar, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 395 days.

(21) Appl. No.: 13/460,027

(22) Filed: Apr. 30, 2012

(65) Prior Publication Data

US 2012/0278466 A1    Nov. 1, 2012

(30) Foreign Application Priority Data

Apr. 30, 2011 (IN) .......................... 1504/CHE/2011

(51) Int. Cl.
*G06F 15/16* (2006.01)
*H04L 12/64* (2006.01)

(52) U.S. Cl.
CPC .................. *H04L 12/6418* (2013.01)

(58) Field of Classification Search
CPC ..... H04W 60/00; H04W 76/00; H04W 76/02; H04W 12/08; H04W 40/24; H04L 5/00; H04L 5/0091; H04L 47/70
USPC .................. 709/217, 219, 223, 225, 227, 228
See application file for complete search history.

(56) References Cited

U.S. PATENT DOCUMENTS

| | | | |
|---|---|---|---|
| 7,254,136 B1 * | 8/2007 | Gunter et al. .................. 370/401 |
| 7,353,405 B2 * | 4/2008 | Chevalier et al. ............. 713/168 |
| 7,924,780 B2 * | 4/2011 | Waisman-Diamond ...... 370/329 |
| 8,019,683 B1 * | 9/2011 | Swanburg ............ G06Q 20/102 370/259 |
| 8,385,827 B2 * | 2/2013 | Kravitz et al. ................ 455/41.2 |
| 8,661,133 B2 * | 2/2014 | Park et al. ...................... 709/226 |
| 2006/0031515 A1 * | 2/2006 | Van Gassel et al. .......... 709/227 |
| 2008/0195738 A1 * | 8/2008 | Luo ................................ 709/227 |
| 2012/0240197 A1 * | 9/2012 | Tran et al. ......................... 726/4 |

* cited by examiner

*Primary Examiner* — Viet Vu
(74) *Attorney, Agent, or Firm* — The Farrell Law Firm, P.C.

(57) ABSTRACT

A method and apparatus for managing Internet Connection Sharing (ICS) in a primary mobile device are provided. The method includes establishing a device management session with a service provider; receiving an Internet connection-sharing criterion from the service provider; and checking the Internet connection-sharing criterion upon receiving an Internet connection sharing request from a peer mobile device.

8 Claims, 4 Drawing Sheets

METHOD AND APPARATUS FOR MANAGING INTERNET CONNECTION SHARING

PRIORITY

This application claims priority under 35 U.S.C. §119(a) to an Indian Provisional Patent Application filed in the Indian Intellectual Property Office on Apr. 30, 2011 as assigned Serial No. 1504/CHE/2011 and an Indian Complete Patent Application filed in the Indian Intellectual Property Office on Feb. 17, 2012 and assigned Serial No. 1504/CHE/2011, the entire disclosures of which are incorporated herein by reference.

BACKGROUND OF THE INVENTION

1. Field of the Invention

The present invention relates generally to Internet Connection Sharing (ICS), and more particularly, to a method and apparatus for managing ICS in mobile devices.

2. Description of the Related Art Internet Connection Sharing (ICS) is a method for sharing a single Internet connection on one computer device between other computer devices on the same Local Area Network (LAN). ICS allows several computing devices to share the Internet connection with one primary computing device. If several computing devices are connected to one primary computing device, and the primary computing device has an Internet connection, then all of the other computing devices connected to the primary computing device can easily use the Internet connection offered. This sharing mechanism allows other computing devices to avoid subscribing to an Internet service individually since the other computing devices will be able to use the primary computing device's Internet connection.

Further, Internet Connection Sharing (ICS) in mobile technology allows Mobile Equipments (MEs), without any subscription to General Packet Radio Service (GPRS) or a High Speed Packet Access (HSPA) service, to access the Internet services over a BlueTooth (BT) or a Wi-Fi connection. Existing mobile technology offers ICS to peer mobile devices to access the Internet from one primary mobile device that has subscribed to the Internet using GPRS/HSPA. Peer mobile devices access the Internet service through the primary mobile device using any wireless communication means such as Bluetooth, Wi-Fi and on the like.

Although the ICS has offered advantages to connection sharing, it has several drawbacks. The service providers do not have control of the number of peer mobile devices that access the Internet through the primary mobile device that has made an Internet service contact with the service provider. For example, a Mobile Equipment (the primary ME) is subscribed to an operator's unlimited data plan over a Global System for Mobile Communications (GSM) or a Universal Mobile Telecommunications System (UMTS) network. When the primary ME is connected to multiple other MEs (peer MEs) over BlueTooth Personal Area Network (BT PAN) profile, the peer MEs, although not being subscribed to any Internet service provided by a service provider, are able to access the Internet services using Internet connection shared by primary ME. Thus, peer MEs are able to use online services using the unlimited data plan of the primary ME. However, this is an undesirable usage from the service provider/operator's point of view. ICS is a desirable feature, but when the number of peer MEs sharing the Internet connection exceeds a certain limit, it increases the load on operators' network infrastructure. The operators are unable to control the Internet sharing and load on the operator network. Further, the service providers have no control as to the amount of data that the peer mobile device can use through the primary mobile device.

Thus, there is a need for a method for enabling a service provider to control the number of peer MEs and amount of data that the peer ME can use through the primary mobile device.

SUMMARY OF THE INVENTION

Accordingly, an aspect of the present invention provides a scheme for allowing service providers to remotely manage ICS settings of a mobile device.

An aspect of the present invention also provides a scheme for controlling the number of peer mobile devices to share the Internet connection with the primary mobile device.

An aspect of the present invention also provides a scheme for controlling the amount or bandwidth of data that is been shared by peer mobile device.

According to an aspect of the present invention, a method for managing Internet Connection Sharing (ICS) in a primary mobile device is provided. The method includes establishing a device management session with a service provider; receiving an Internet connection-sharing criterion from the service provider; and checking the Internet connection-sharing criterion upon receiving an Internet connection sharing request from a peer mobile device.

According to another aspect of the present invention, an apparatus for managing Internet Connection Sharing (ICS) with a peer mobile device in a primary mobile device is provided. The apparatus includes a Device Management (DM) client for establishing a device management session with the service provider, receiving an Internet connection-sharing criterion from the service provider, and checking the Internet connection-sharing criterion upon receiving an Internet connection sharing request from the peer mobile device.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
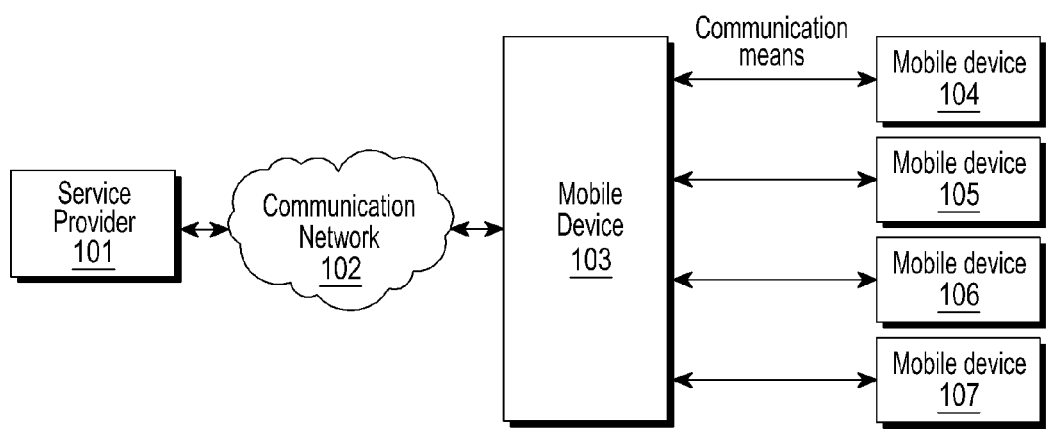
FIG. 1 illustrates Internet Connection Sharing (ICS) according to embodiments of the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Referring now to the drawings, and more particularly to FIGS. 1 through 6, in which similar reference numerals denote corresponding features consistently throughout the figures.

The service provider is referred to as the network operator interchangeably. Further, the mobile device is referred to as a Mobile Equipment (ME).

Hereinafter, a system and method for sharing an Internet connection among mobile devices is disclosed. The method employs a mechanism to remotely manage Internet Connection Sharing (ICS) among mobile devices by the service provider. For this purpose, the method uses new management objects called Internet Connection Sharing Management Object (ICSMO) in Open Mobile Alliance Device Management (OMA DM). The method enables the service provider to configure the Internet connection sharing settings of a mobile device. Thus, the primary mobile device is restricted to share its Internet connection with a pre-defined number of peer mobile devices or there may be a limit on the amount or bandwidth of data shared with the peer mobile devices. Therefore, according to embodiments of the present invention, the service provider or network operator can manage services in a more stable and predictable manner.

FIG. 1 illustrates Internet Connection Sharing (ICS) according to embodiments of the present invention. A system for ICS according to embodiments of the present invention comprises of a service provider 101, communication network 102, a primary mobile device 103 and at least one of peer mobile devices 104, 105, 106 and 107 connected to the primary mobile device 103.

The service provider 101 is a network operator who provides telecommunication services to the primary mobile device 103. In an embodiment, the service provider 101 provides the communication service over GSM or UMTS network and the like. The service provider 101 configures the ICS settings of the primary mobile device 103 for the sharing service. The service provider 101 restricts the ICS based on the number of primary mobile devices or peer mobile devices or based on the bandwidth of usage and the like.

The communication network 102 is a GSM network or an UMTS network and is responsible for facilitating communication between the service provider 101 and the mobile device 103.

The primary mobile device 103 is a mobile device that accesses the Internet through the service provider 101. The primary mobile device 103 shares his Internet connection with peer mobile devices 104, 105, 106 and 107 who want to access the Internet.

Further, the peer mobile devices 104, 105, 106 and 107 are devices sharing the Internet connection with the primary mobile device 103. The means of communication between the primary mobile device 103 and the peer mobile devices 104, 105, 106 and 107 include Bluetooth PAN, Wi-Fi, Infrared Communication (IrDA), and the like.

The mobile devices 103, 104, 105, 106, and 107 are mobile phones or smart phones.

Figure 2:
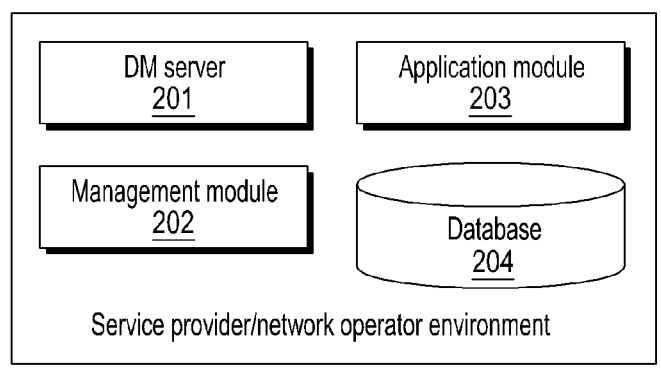
FIG. 2 is a block diagram illustrating a service provider for implementing the ICS service according to embodiments of the present invention.

FIG. 2 is a block diagram illustrating a service provider for implementing the ICS service according to embodiments of the present invention. The service provider (or network operator) 101 includes several modules that are configured for the implementation of the ICS service. The service provider 101 includes a DM server 201, a management module 202, an application module 203 and a database 204.

The DM server 201 is responsible for configuring the ICS settings of the primary mobile devices. During the initiation of a DM session, the DM server 201 configures the DM client on the primary mobile device. The DM server 201 is responsible for limiting the sharing of Internet connection to the number of peers or based on the data usage.

The management module 202 is responsible for performing call handling, supplementary service providing and other management functions.

The application module 203 is responsible for implementations on different applications and services provided by the service provider 101.

The database 204 is responsible for storing various details related to subscribers such as subscription details, supplementary services and so on. It functions as a repository for service provider data.

Figure 3:
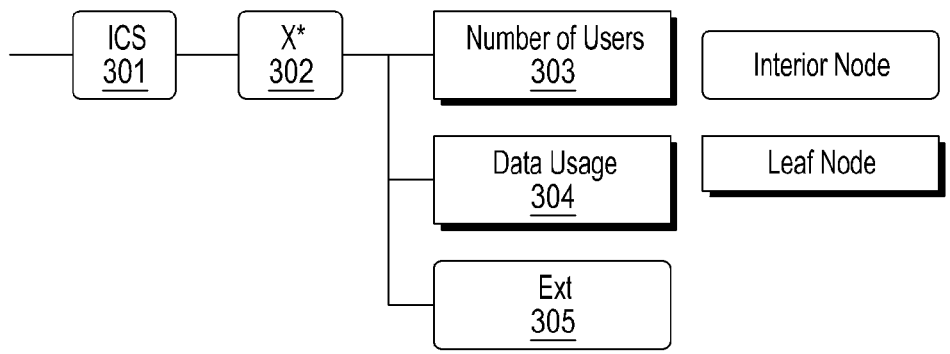
FIG. 3 illustrates the general Internet Connection Sharing Management Object (ICSMO) DM tree according to embodiments of the present invention.

FIG. 3 illustrates the general Internet Connection Sharing Management Object (ICSMO) DM tree according to embodiments of the present invention. As illustrated, the ICSMO allows service providers 101 to remotely manage the Internet connection sharing settings of the mobile devices over the OMA DM protocol. In the ICSMO DM tree, the ICS node 301 has interior nodes and leaf nodes. The interior nodes are namely X* 302 and Ext 305. The leaf nodes include two parameters, namely NumberOfUsers 303 and DataUsage 304. The numberof users 303 allows the service provider to permit the sharing of Internet connection to desired number of users and datausage 304 allows to limit the amount or bandwidth of data shared. Further, the number of leaf nodes can be extended by adding at least one relevant ICS setting nodes as a child node of Ext 305 node. The value of the node X* 302 identifies the protocol used in ICS, which can be defined by service providers or OEMs. Values of X* 302 include, for example, values for identifying BTPAN, Wi-Fi, IrDA and the like.

The parameters defined in the DM tree cannot be manipulated by the client or the server, but can be queried and set by the DM servers using OMA DM commands. The description of the DM nodes defined in ICSMO is as follows:

./ICS/X/NumberOfUsers

This specifies the number of peer mobile devices ('NumberOfUsers') that can share the Internet connection over the protocol X. "NumberOfUsers" is 0 or a positive number. For Example, the DM server sends the below DM command to the primary ME to restrict the NumberofUsers in ICS over the BTPAN profile to 3.

```
<Add>
<CmdID>1</CmdID>
<Item>
<Target>
<LocURI>./ICS/BTPAN/NumberOfUsers</LocURI>
</Target>
<Data>3</Data>
</Item>
</Add>
```

After the DM client on the primary ME successfully executes the above DM command, the primary ME cannot share Internet connection over BT PAN with more than 3 peer MEs. If a 4$^{th}$ peer ME requests sharing of the Internet connection, the primary ME, will reject the request.

Similarly, the DM server can restrict the NumberofUsers to 3 in ICS over Wi-Fi by sending the below DM command to the primary ME configured as a Wi-Fi-AP depicted below:

```
<Add>
<CmdID>1</CmdID>
<Item>
<Target>
<LocURI>./ICS/Wifi/NumberOfUsers</LocURI>
</Target>
<Data>3</Data>
</Item>
</Add>
```

./ICS/X/DataUsage

The embodiment below specifies the amount of data (e.g., in megabytes) that can be transferred or received over the protocol X. 'DataUsage' is 0 or a positive number. 'DataUsage' defines the amount of data that can be transferred of received during a specific period. In an embodiment, 'DataUsage' defines a total bandwidth that can be shared by peer MEs simultaneously. For example,

```
<Add>
<CmdID>1</CmdID>
<Item>
<Target>
<LocURI>./ICS/BTPAN/DataUsage</LocURI>
</Target>
<Data>600</Data>
</Item>
</Add>
```

After the DM client on the primary ME successfully executes the above DM command, the primary ME will not allow more than 600 MB of network data download in ICS over BT PAN. When the total download of all the peer MEs reaches 600 MB any further download request from the peers are rejected by the primary ME.

Similarly, the DM server can restrict the total DataUsage to 600 MB in ICS over Wi-Fi by sending the below DM command to the ME configured as a Wi-Fi-AP as shown below:

```
<Add>
<CmdID>1</CmdID>
<Item>
<Target>
<LocURI>./ICS/Wifi/DataUsage</LocURI>
</Target>
<Data>600</Data>
</Item>
</Add>
```

./ICS/X/Ext

This is an interior node provided for Original Equipment Manufacturers (OEMs) and operators to add multiple other ICS settings as leaf nodes. Based on protocol needs, OEMs can control multiple other parameters in ICS by adding multiple leaf nodes under an "Ext" node, to do the following: 1. Display an alert to the user to indicate that the total data download in ICS is approaching the limit. 2. Restrict peer bandwidth. 3. Configure granularity for upload and download. 4. Block protocol-specific data such as "Block all Video traffic", "Block P2P traffic" etc. For example: The DM server can send the extended ICS settings in <NewNode> for the Wifi protocol using the below DM command:

```
<Add>
<CmdID>1</CmdID>
<Item>
<Target>
<LocURI>./ICS/Wifi/Ext/<NewNode></LocURI>
</Target>
<Data><Value></Data>
</Item>
</Add>
```

Figure 4:
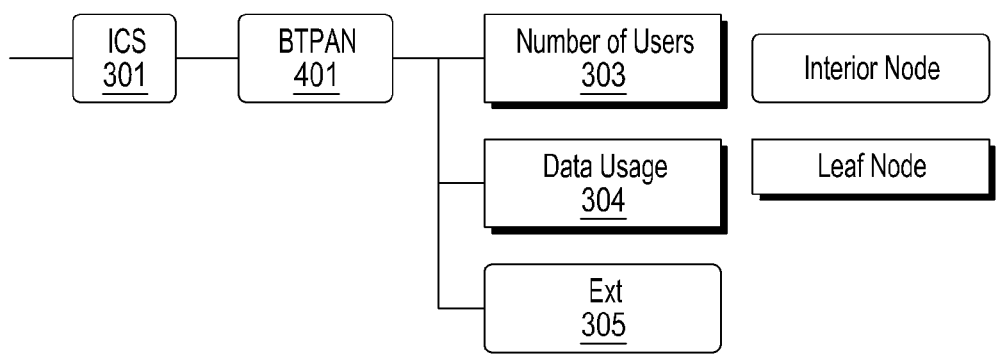
FIG. 4 illustrates the Internet Connection Sharing Management Object (ICSMO) DM tree over Bluetooth PAN profile according to embodiments of the present invention.

FIG. 4 illustrates the Internet Connection Sharing Management Object (ICSMO) DM tree over Bluetooth PAN Profile, according to embodiments as disclosed herein. The mode of connectivity employed herein for Internet sharing is Bluetooth. The Internet connection on the primary mobile device 103 is shared with other peer mobile devices over the Bluetooth PAN Profile. As illustrated, the ICS 301 tree includes internal nodes which include BTPAN 401 and Ext 305. The leaf nodes are pre-defined number of users 303 (peers) or the total amount of data 304 shared in terms of bandwidth. These factors are used to limit sharing an Internet connection. In an embodiment, the service providers can use the DM tree shown in FIG. 4 to control ICS through BT PAN Profile.

Figure 5:
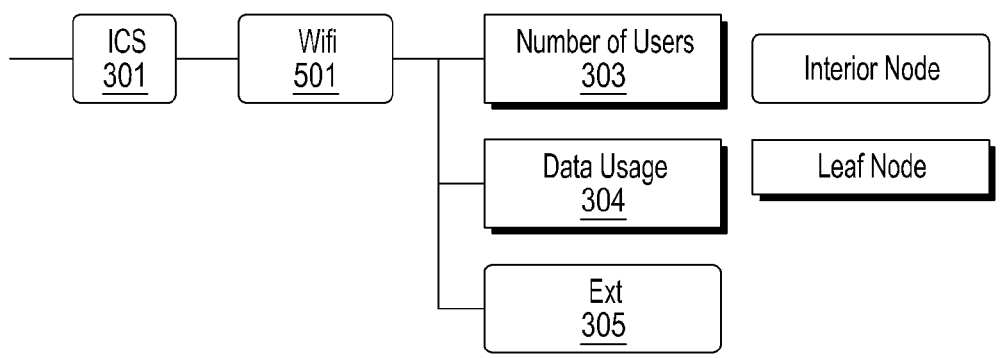
FIG. 5 illustrates the Internet Connection Sharing Management Object (ICSMO) DM tree over Wi-Fi according to embodiments of the present invention.

FIG. 5 illustrates the Internet Connection Sharing Management Object (ICSMO) DM tree over Wi-Fi according to embodiments of the present invention. The mode of connectivity employed herein for Internet sharing is Wi-Fi; however a connection mode such as Bluetooth or IrDA is also used. The Internet connection on the primary mobile device 103 is shared with other peer mobile devices by using Wi-Fi. As illustrated, the ICS 301 tree includes internal nodes that include Wi-Fi 501 and Ext 305. The leaf nodes are pre-defined number of users 303 (peers) or the total amount of data 304 shared in terms of bandwidth. This may be used to limit the use of Internet sharing. In an embodiment, if a mobile device is configured as a Wi-Fi Access Point and multiple mobile devices are connected to the Wi-Fi access point for Internet connection sharing, the service providers 101 can employ the DM tree shown in FIG. 5 to manage ICS settings of the Wifi-AP.

The Device Description Framework of ICSMO used by the DM server to manage the ICS settings over OMA DM protocol is shown below.

```
<MgmtTree xmlns:MSFT="http://schemas.microsoft.com/MobileDevice/DM">
<VerDTD>1.2</VerDTD>
<Node>
<NodeName>ICS</NodeName>
<Path>.</Path>
<DFProperties>
<AccessType><Get /></AccessType>
<DFFormat><int /></DFFormat>
<Occurrence><One /></Occurrence>
<Scope><Dynamic /></Scope>
<DFType><MIME>text/plain</MIME></DFType>
<Description></Description>
</DFProperties>
<Node>
<NodeName>X</NodeName>
<DFProperties>
<AccessType><Get /><Add /><Replace /><Delete /></AccessType>
<DFFormat><node /></DFFormat>
<Occurrence><One /> </Occurrence>
<Scope> <Dynamic /></Scope>
```

-continued

```
    <DFType> <MIME>text/plain</MIME></DFType>
    <Description></Description>
  </DFProperties>
  <Node>
  <NodeName>NumberOfUsers</NodeName>
  <DFProperties>
    <AccessType><Get /><Add /><Replace /><Delete /></AccessType>
    <DFFormat><chr /></DFFormat>
    <Occurrence> <One /> </Occurrence>
    <Scope> <Dynamic /> </Scope>
    <DFType><MIME>text/plain</MIME></DFType>
    <Description></Description>
  </DFProperties>
  </Node>
  <Node>
  <NodeName>DataUsage</NodeName>
  <DFProperties>
    <AccessType><Get /><Add /><Replace /><Delete /></AccessType>
    <DFFormat><chr /></DFFormat>
    <Occurrence><One /></Occurrence>
    <Scope><Dynamic /></Scope>
    <DFType><MIME>text/plain</MIME></DFType>
    <Description></Description>
  </DFProperties>
  </Node>
  <Node>
  <NodeName>Ext</NodeName>
  <DFProperties>
    <AccessType><Get /></AccessType>
    <DFFormat><node /></DFFormat>
    <Occurrence> <One /> </Occurrence>
    <Scope><Dynamic /></Scope>
    <DFType><MIME>text/plain</MIME></DFType>
    <Description></Description>
  </DFProperties>
  </Node>
  </Node>
  </Node>
  </MgmtTree>
```

Figure 6:
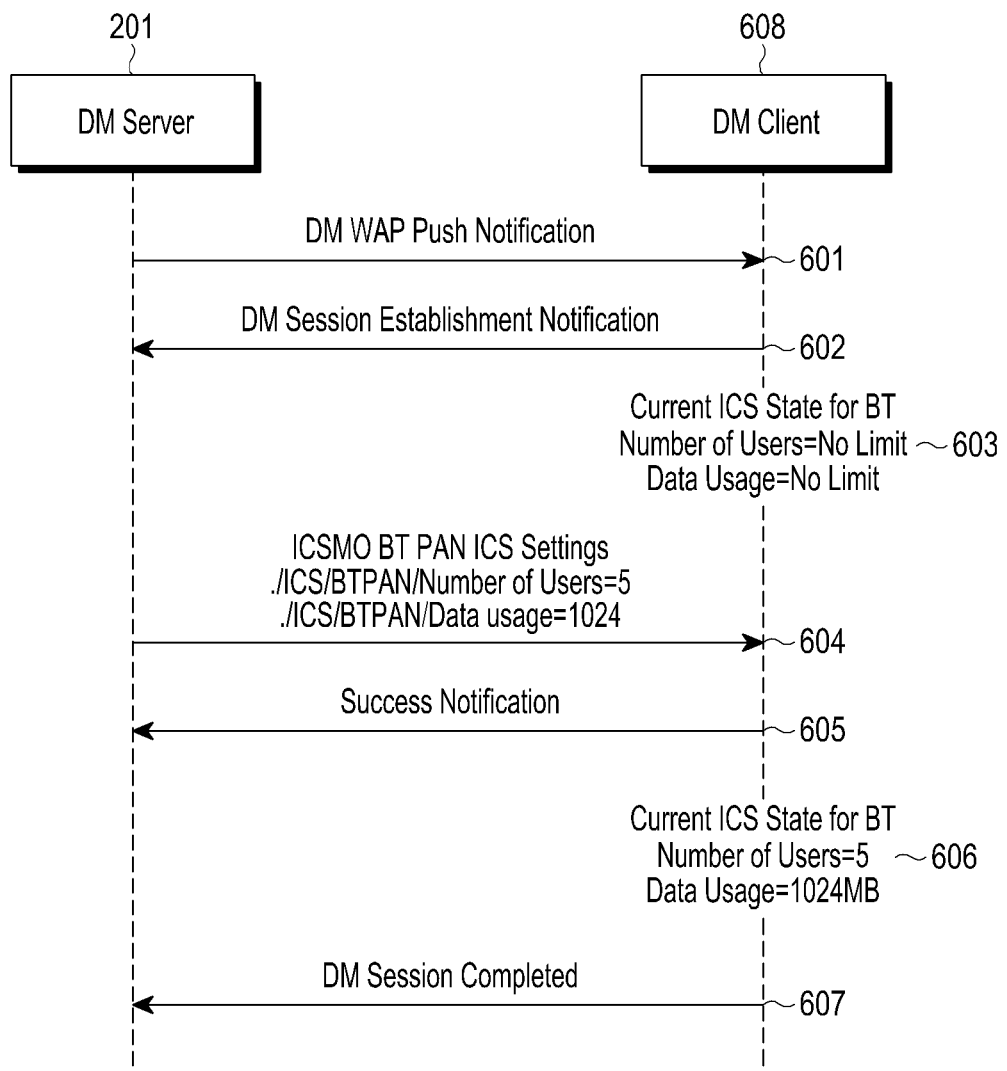
FIG. 6 illustrates the flow of DM Messages using Internet Connection Sharing Management Object (ICSMO) for Bluetooth PAN Settings according to embodiments of the present invention.

FIG. 6 illustrates the flow of DM Messages using an Internet Connection Sharing Management Object (ICSMO) for Bluetooth PAN Settings according to embodiments of the present invention. Considering the means of sharing employed is Bluetooth, the usage of ICS over Bluetooth can be controlled by service providers in terms of amount of data transferred (./ICS/BTPAN/DataUsage) or the number of users (IICS/BTPAN/NumberOfUsers) using ICSMO Bluetooth PAN Settings.

In step 604, the DM server 201 residing at the service provider 101 side sends a DM WAP push notification to the mobile device. The DM client 608 on the mobile device is responsible for accepting commands and configurations from the DM server 201 and configuring the mobile device. In step 602, the DM client 608 then sets up the secure transport channel with the DM server 201 and establishes the DM session. In step 603, the current state of the mobile device for ICS over Bluetooth PAN is that there is no limit on the number of users that can share the Internet connection and no limit on the amount of data usage.

In step 604, the DM server 201 sends the ICS settings of the BT PAN to restrict the usage of Internet. The number of users allowed to share the Internet connection in the transmitted ICS setting is restricted to 5, and the amount of data available to the users allowed to share the Internet connection is limited to 1024 MB.

Thereafter, in step 605, the DM handler 608 of the mobile device configures the BT ICS settings and sends the success notification to the DM server 201. In step 606, the current state of the mobile device is that the number of peer mobile devices allowed to share the Internet connection is 5 and the total sum of data available to the peer mobile devices is limited to 1024 MB. Further, the ICS settings for BT are successfully configured.

In step 607, the DM server 201 then parses the package received from the DM client 608, and if it is determined that the BT ICS setting is successfully configured, the DM server 201 sends the last DM message to the mobile device to end the session and the session is then terminated.

Figure 7:
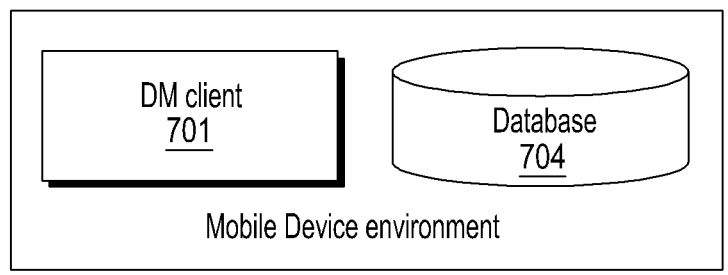
FIG. 7 is a block diagram illustrating a mobile device according to embodiments of the present invention.

FIG. 7 is a block diagram illustrating a mobile device according to embodiments of the present invention.

Referring to FIG. 7, the mobile device according to embodiments of the present invention includes a DM client 701 and a database 704.

The DM client 701 forms a device management session with a service provider. The device management session may be established by using an OMA DM protocol that uses an ICSMO. Once the device management session is established, the DM client 701 receives an Internet connection-sharing criterion from the service provider. The received Internet connection-sharing criterion is stored in the database 704. The DM client 701 checks the Internet connection-sharing criterion if it has received an Internet connection sharing request from a peer mobile device. If the Internet connection-sharing request from the peer mobile device exceeds the Internet connection-sharing criterion, the DM client 701 rejects the Internet connection sharing request from the peer mobile device. The Internet connection-sharing criterion includes the number of peer mobile devices that allow simultaneous Internet connection sharing therefrom. The Internet connection-sharing criterion also includes a total data amount available to the peer mobile devices that allow simultaneous Internet connection sharing therefrom. Further, the Internet connection-sharing criterion includes a total bandwidth available to the peer mobile devices allowing simultaneous Internet connection sharing therefrom.

According to the present invention, the Internet service provider or network operator is able to manage services in a stable and consistent manner.

The embodiments of the present invention may be performed by a standalone integrated circuit or an integrated circuit present within the device as described herein, where the integrated circuit is an electronic circuit manufactured by the patterned diffusion of trace elements into the surface of a thin substrate of semiconductor material. The integrated circuit further includes at least one processor and one memory element. The integrated circuit may be a Digital integrated circuit, an analog integrated circuit or a combination of analog and digital integrated circuits and made available in a suitable packaging means.

The embodiments of the present invention can be implemented through at least one software program running on at least one hardware device and performing network management functions to control the elements. The elements shown in FIGS. 1 and 2 include blocks that can be at least one of a hardware device, or a combination of hardware device and software module.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A method for managing Internet Connection Sharing (ICS) in a primary mobile device, the method comprising:

establishing a device management session with a service provider;

receiving an Internet connection-sharing criterion from the service provider;

checking the Internet connection-sharing criterion upon receiving an Internet connection sharing request from at least one peer mobile device, and determining whether to share an internet connection of the primary mobile device with the at least one peer mobile device based on the Internet connection-sharing criterion, wherein the Internet connection-sharing criterion comprises a maximum number of peer mobile devices permitted to simultaneously share the internet connection with the primary mobile device.

2. The method of claim 1, further comprising:

rejecting the Internet connection sharing request from the peer mobile device, if the Internet connection sharing request from the peer mobile device exceeds the Internet connection-sharing criterion.

3. The method of claim 1, wherein establishing the device management session comprises:

establishing the device management session by using an Open Mobile Alliance Device Management (OMA DM).

4. The method of claim 1, wherein the Internet connection-sharing criterion comprises an amount of data or a bandwidth shared by the primary mobile device.

5. An apparatus for managing Internet Connection Sharing (ICS) with a peer mobile device in a primary mobile device, the apparatus comprising:

a computer processor;

a memory for storing processor-executable processing instructions which, when executed by the computer processor, implement a Device Management (DM) client; and the DM client for establishing a device management session with a service provider, receiving an Internet connection-sharing criterion from the service provider, checking the Internet connection-sharing criterion upon receiving an Internet connection sharing request from the peer mobile device, and determining whether to share an internet connection of the primary mobile device with the at least one peer mobile device based on the Internet connection-sharing criterion, wherein the Internet connection-sharing criterion comprises a maximum number of peer mobile devices permitted to simultaneously share the internet connection with the primary mobile device.

6. The apparatus of claim 5, wherein the DM client rejects the Internet connection-sharing request from the peer mobile device, if the Internet connection sharing request from the peer mobile device exceeds the Internet connection-sharing criterion.

7. The apparatus of claim 5, wherein the DM client establishes the device management session by using an Open Mobile Alliance Device Management (OMA DM).

8. The apparatus of claim 5, wherein the Internet connection-sharing criterion comprises an amount of data or a bandwidth shared by the primary mobile device.

* * * * *